(No Model.)
W. AAB.
TIRE.
No. 605,986. Patented June 21, 1898.
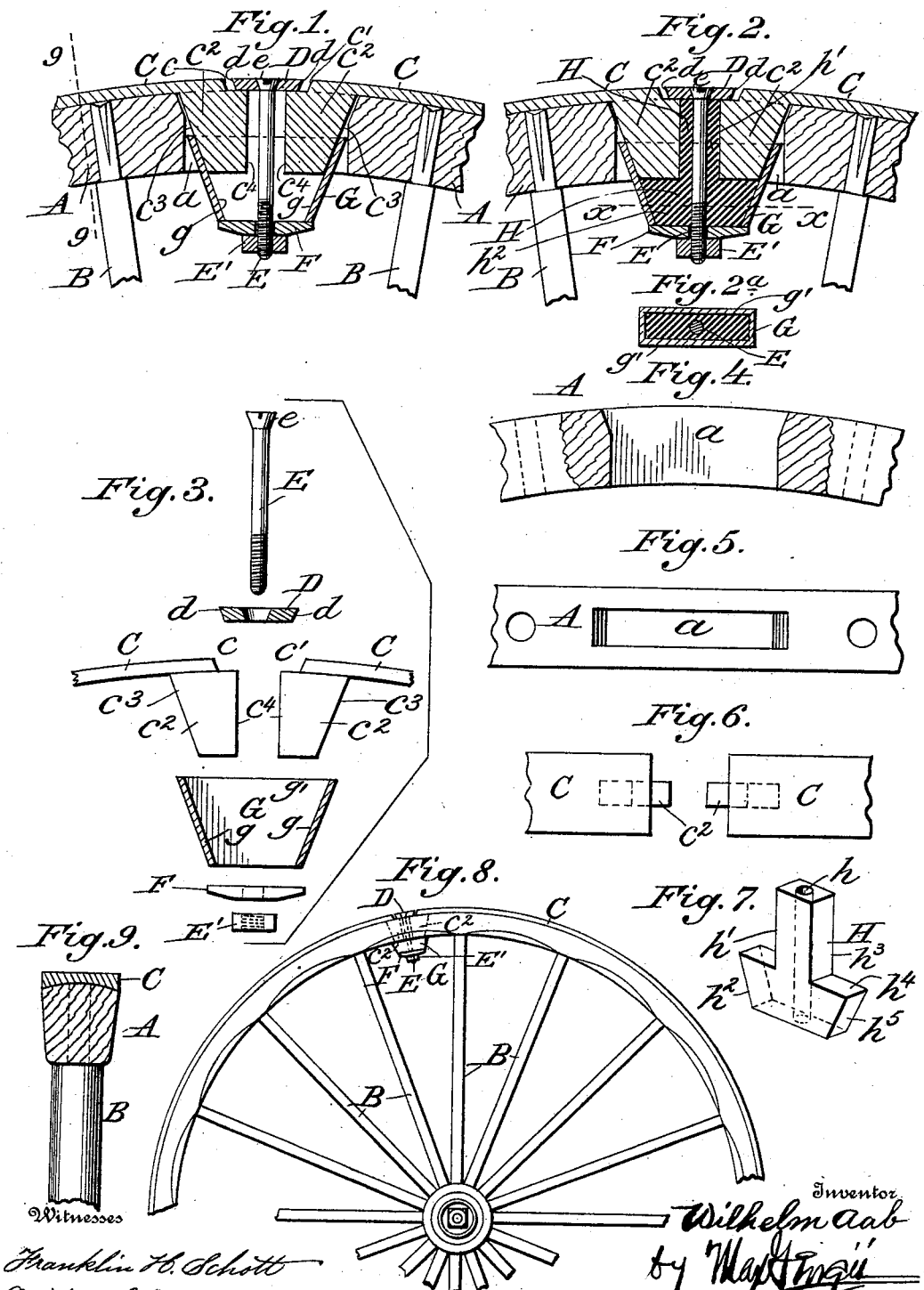
Witnesses
Franklin H. Schott
Mitford C. Massie
Inventor
Wilhelm Aab
by Max Engel
His Attorney

UNITED STATES PATENT OFFICE.

WILHELM AAB, OF NEW ULM, MINNESOTA.

TIRE.

SPECIFICATION forming part of Letters Patent No. 605,986, dated June 21, 1898.

Application filed February 14, 1898. Serial No. 670,278. (No model.)

*To all whom it may concern:*

Be it known that I, WILHELM AAB, a citizen of the German Empire, residing at New Ulm, in the county of Brown and State of Minnesota, have invented certain new and useful Improvements in Tires; and I do hereby declare the following to be a full, clear, and exact description of the invention, such as will enable others skilled in the art to which it appertains to make and use the same.

My invention relates to improvements in tires for vehicles, and in particular to means for connecting the ends of a metallic tire.

The object of my invention is to provide a tire having a fastening device by which the tire can be set or shortened when desired by unskilled persons without delay and without the use of special tools and which at the same time will be durable.

With these and some other objects in view, which will be fully understood by those skilled in the art, my invention consists in the features, details of construction, and combination of parts which will first be described in connection with the accompanying drawings and then particularly pointed out in the claims.

In the drawings, Figure 1 is a longitudinal section of the ends of a tire with a connecting device embodying my invention; Fig. 2, a similar view of a modification in which is employed a filling-block; Fig. 2$^a$, a section on the line $x$ $x$, Fig. 2; Fig. 3, a detail view showing the parts detached; Fig. 4, a longitudinal section of the felly; Fig. 5, a plan of the same; Fig. 6, a detail plan view of the tire ends; Fig. 7, a perspective view of a filling-block; Fig. 8, a side elevation of part of a wheel with my device attached; and Fig. 9, a transverse section through the felly and tire on the line 9 9, Fig. 1.

Referring to the drawings, A indicates the felly of a wheel having the usual spokes B. In the felly is provided a longitudinal slot $a$, extending entirely through the felly, which slot may be made at a joint in the felly, if desired, or in a solid portion of the same. A tire C surrounds the felly, the length of the tire being such that its two ends $c$ $c'$ do not meet, but are separated by a considerable interval, as illustrated in the drawings, for a purpose hereinafter described. The outer or peripheral face of the felly is rounded, as shown in Fig. 9, and the inner surface of the tire is made concave to conform to the said surface of the felly and fit closely against said felly. The ends $c$ $c'$ of the tire are preferably beveled or chamfered, as shown, and to the under side of each end is secured a block $c^2$, these blocks being arranged to fit into the slot $a$ in the felly. The blocks may be secured to the ends of the tire in any suitable manner, as by welding or by forming them integral with the tire ends in a drop-press or otherwise, and are preferably at the middle of such tire ends.

The remote faces $c^3$ of the blocks are sloped, so that the blocks are narrower at the bottom than at the top, the adjacent faces $c^4$ of said blocks being, preferably, substantially straight and parallel, the blocks thus having the form of truncated wedges.

D is a tire-plate, preferably having its ends $d$ beveled to correspond to the chamfers or bevels at the ends $c$ $c'$ of the tire, so that when the tire is drawn up its ends will fit closely to the ends of said tire-plate and will form lap-joints therewith, the ends of the tire-plate lapping outside the ends of the tire. Through the tire-plate is passed a bolt E, whose head $e$ is countersunk into the said plate D and whose inner end is threaded for the reception of a nut E', the bolt passing in a substantially radial direction between the two blocks $c^2$ and extending inward beyond said blocks. Beneath the nut is a washer-plate F, whose ends rest upon a draw collar or sleeve G, which fits over the lower or inner portions of the blocks $c^2$, having its opposite interior end faces $g$ sloped or beveled to correspond to the slopes of the remote faces $c^3$ of the said blocks $c^2$, the lateral faces $g'$ of this draw-collar being parallel, the exterior portion of the collar entering the slot $a$ in the felly, thus inclosing the lower portions of the blocks, the sloping faces of the blocks and sleeve forming coacting wedge surfaces.

It will be obvious that by screwing up the nut E' the draw-collar G will be forced outward farther into the slot $a$ and toward the tire-plate, and, furthermore, owing to its sloping sides $g$ and the sloping faces $c^3$ of the blocks $c^2$, the said blocks, and with them the tire ends, will be drawn toward each other, thereby tightening the tire on the wheel. This may be done from time to time as circumstances may require with the aid of any ordinary wrench which will fit the nut E' and without requiring skill on the part of the operator.

To remove the tire, it is only necessary to remove the nut E' and plate F and withdraw the bolt E and tire-plate D, whereupon the sleeve G may be taken off and the blocks $c^2$ drawn out of the slot $a$ by springing the tire ends outward, thus permitting the tire to be taken off. A reversal of these steps is necessary in replacing the tire, which may then be drawn up to the desired extent by tightening the nut E, the proportions of the parts being such that a suitable space will be left between the adjacent faces of the blocks $c^2$ to permit them to move some distance toward each other before coming into contact with the bolt E. Moreover, the tire-plate D is of such size with relation to the other parts as to permit the tire ends to move toward each other an amount equivalent to the maximum movement of the blocks $c^2$, so that the ends of said tire-plate and the ends of the tire will only come into close contact when the adjacent faces of the blocks $c^2$ are in contact with the bolt E. Furthermore, the width of the blocks $c^2$ at their outer faces and the length of the tire-plate D are so proportioned that the tire-plate will always rest upon the said outer faces of the blocks $c^2$, bridging over the space between the said blocks, as will be clear from the drawings.

In order to avoid any liability of rattling and to further strengthen the wheel at the point where my device is employed, I preferably fill the space between the adjacent faces of the blocks $c^2$ and between the lower or inner ends of said blocks and the washer-plate F around the bolt E with suitable material, such as wood or rubber, this filling being preferably in the form of a block H, as shown in Fig. 7, which has a central bolt-hole $h$, a reduced portion $h'$, rectangular in cross-section, arranged to enter between the adjacent faces of the blocks $c^2$ when at their maximum distances apart, and an enlarged portion $h'$, arranged to fill the lower end of the inside of the draw-collar G. If this filling-block H is of hard wood or similar material which cannot conveniently be compressed when the nut E' is screwed up to tighten the tire, the nut and washer-plate may be removed and the filling-block H drawn out, whereupon the latter may be made smaller, as by using a rasp or file on its faces $h^2$ $h^3$ $h^4$. Then upon replacing the block H, washer-plate F, and nut E the latter may be screwed until the block $c^2$ again comes into contact with the faces $h^2$ of the filling-block.

By employing a rubber or cork filling-block or one of soft wood a certain amount of compression of the said block may take place without the necessity of removing such block to decrease its size.

By making the outer surface or periphery of the felly convex in cross-section and the inner surface of the tire concave in cross-section to fit closely against the said felly all danger of the tire being displaced laterally is avoided, while at the same time avoiding the use of tire-bolts to hold the tire in place.

Having thus fully described my invention, what I claim as new, and desire to secure by Letters Patent of the United States, is—

1. In a vehicle-tire, the combination with a tire, blocks secured to the ends of said tire, and a sleeve arranged to extend over said blocks, said sleeve and blocks having coacting wedge surfaces, of means for moving the sleeve with relation to said blocks, substantially as described.

2. In a vehicle-tire, the combination, with a tire, blocks secured to the ends of said tire, and a sleeve arranged to extend over said blocks, said sleeve and blocks having coacting wedge surfaces, of a tire-plate, a bolt extending through the tire-plate and between the blocks, and a nut on the bolt and arranged to draw up the sleeve on the blocks, substantially as described.

3. In a vehicle-tire, the combination, with a tire, blocks secured to the ends of said tire, a sleeve arranged to extend over said blocks, said sleeve and blocks having coacting wedge surfaces, and a felly provided with a slot arranged to receive the blocks, of means for moving the sleeve with relation to the blocks, substantially as described.

4. In a vehicle-tire, the combination, with a tire, blocks secured to the ends of said tire, a sleeve arranged to extend over said blocks, and means for moving the sleeve with relation to the blocks, of a filling-block between said blocks and within the sleeve, substantially as described.

5. In a vehicle-tire, the combination with a tire, whose ends are chamfered, blocks secured to the end of the tire and arranged to project beyond said ends, a sleeve arranged to extend over said blocks, said blocks and sleeve having coacting wedge surfaces, and a tire-plate provided with sloping ends corresponding to the chamfered ends of the tire, and resting on the projecting portions of the blocks, of means connected to the tire-plate for drawing the sleeve toward it, substantially as described.

6. In a vehicle-tire, the combination, with a tire, blocks secured to the ends of the tire, and a sleeve arranged to extend over said blocks, said sleeve and blocks having coacting wedge surfaces, of a tire-plate arranged between the ends of the tire, a felly having a slot into which the blocks project, a bolt passing through the tire-plate, through the slot in the felly, between the blocks and through the sleeve, a washer-plate on the bolt, and engaging the sleeve, and a nut for pressing the washer-plate and sleeve toward the tire-plate substantially as described.

In testimony whereof I affix my signature in presence of two witnesses.

WILHELM AAB.

Witnesses:
    JOHN LIND,
    NELS ANDERSON.